United States Patent [19]

Leong

[11] 4,177,941
[45] Dec. 11, 1979

[54] METERING DEVICE

[75] Inventor: Basil K. J. Leong, Portage, Mich.

[73] Assignee: International Research and Development Corporation, Mattawan, Mich.

[21] Appl. No.: 847,774

[22] Filed: Nov. 2, 1977

[51] Int. Cl.$^2$ ............................................. G01F 11/24
[52] U.S. Cl. ................................. 222/636; 222/238; 222/288; 222/333
[58] Field of Search ............... 222/194, 238, 236, 288, 222/370, 333, 231, 134

[56] References Cited

U.S. PATENT DOCUMENTS

| 483,655 | 10/1892 | Lang | 222/238 X |
|---|---|---|---|
| 532,603 | 1/1895 | Snavely | 222/238 X |
| 748,549 | 12/1903 | White | 222/238 X |
| 1,969,533 | 8/1934 | Pipes et al. | 222/134 X |
| 2,366,379 | 1/1945 | Bemis | 222/146 HE X |
| 2,685,388 | 8/1954 | Steiner | 222/333 UX |
| 3,013,701 | 12/1961 | Joschko | 222/231 UX |
| 3,201,001 | 8/1965 | Roberts et al. | 222/194 |

Primary Examiner—John P. Shannon
Attorney, Agent, or Firm—Gordon W. Hueschen

[57] ABSTRACT

There is disclosed a metering device for metering finely divided material which is capable of handling both free-flowing powders and non-free-flowing powders. The device comprises an upright mixing chamber or reservoir having an axially-disposed stirrer therein. Adjacent thereto is a motor-driven shaft having a metering disc attached thereto with a portion extending into the mixing chamber. The motor-driven axial shaft of the metering disc is connected to the axial shaft of the stirrer by a gear train. Each shaft has replaceable gears attached thereto, adapted to mesh with an idler gear. The idler gear is mounted on an adjustable arm so that the position thereof can be changed when one or both of the replaceable gears is replaced by a gear of different size. In one form of the invention, the stirrer comprises radially-disposed arms projecting from the rotatable shaft, each arm of which is angularly displaced with reference to the arm above or below it and is curved away from the direction of rotation. In another form of the invention, the metering disc comprises a composite disc which is replaceable with another composite disc having a different metering capacity.

16 Claims, 9 Drawing Figures

U.S. Patent    Dec. 11, 1979    Sheet 3 of 3    4,177,941
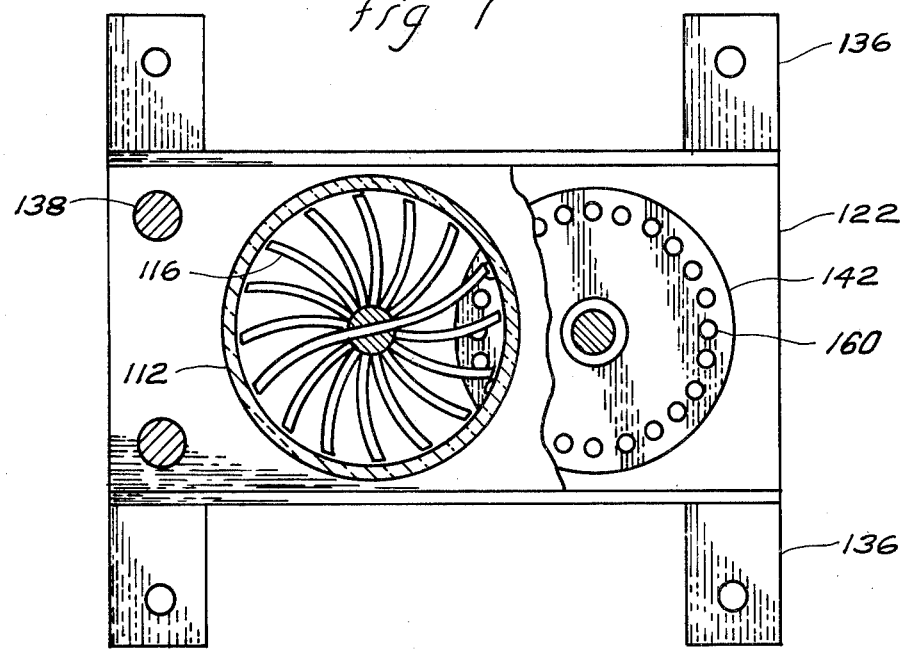
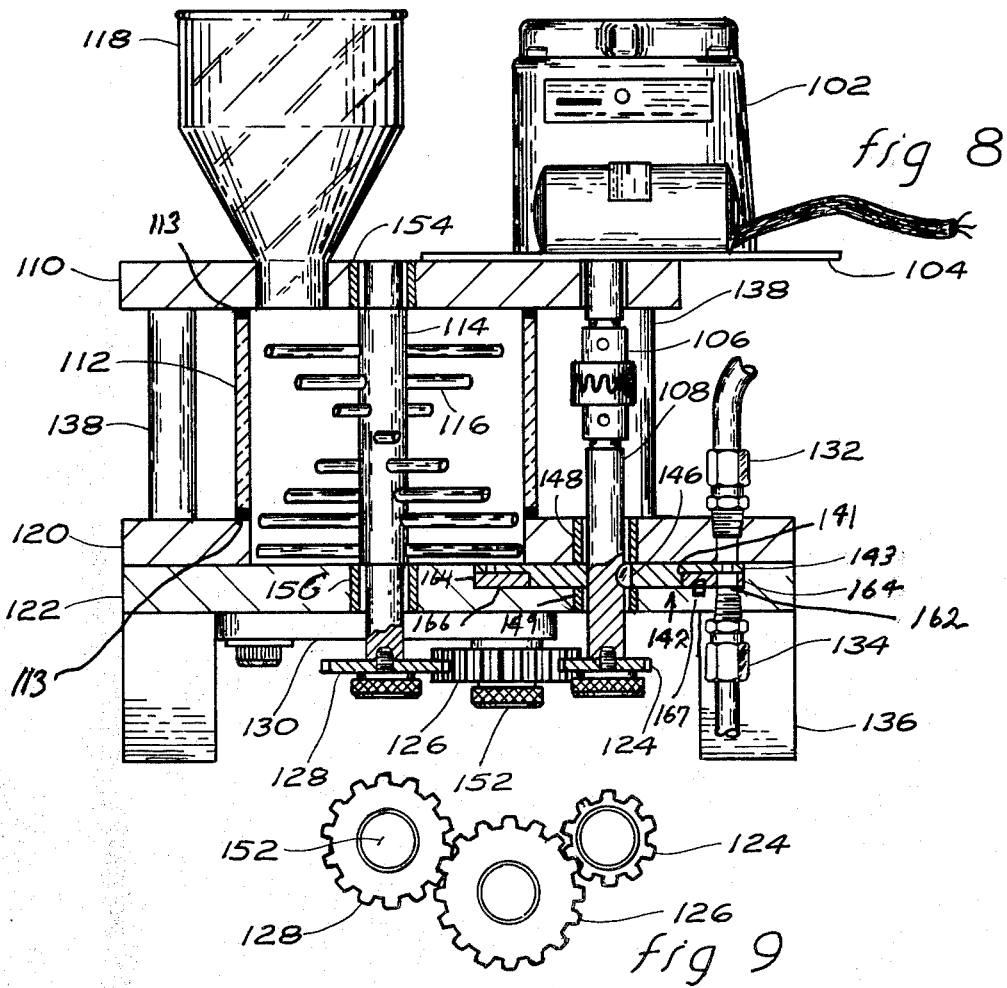

METERING DEVICE

FIELD OF INVENTION AND PRIOR ART

This invention relates to a metering device for metering a powdered material which is capable of handling both free-flowing powders and non-free-flowing powders.

Devices of this kind are known in the art which comprise a mixing chamber having motor-driven stirring means therein and a motor-driven metering means for removing measured portions of powdered material from the mixing chamber.

One such device is seen in U.S. Pat. No. 666,841 and another in U.S. Pat. No. 2,366,379. In another such device of my own origination, not completely satisfactory, the stirring means and the metering means are driven by separate motors.

OBJECTS OF THE INVENTION

It is an object of the invention to provide an improved metering device for metering a powdered material and which is capable of handling both free-flowing powders and non-free-flowing powders. It is a further object of the invention to provide such a device which is economical to manufacture. It is a further object of the invention to provide such a device which accurately meters the powdered material. It is a further object of the invention to provide such a device which is readily adjustable to handle different types of powdered material. It is a further object of the invention to provide such a device which is readily adjustable to provide for the discharge of different amounts of material. Further objects of the invention are to avoid the disadvantages of the prior art and to obtain such advantages as will appear as the description proceeds.

BRIEF DESCRIPTION OF THE INVENTION

The invention is directed to a metering device for metering a powdered material which is capable of handling both free-flowing powders and non-free-flowing powders and which comprises a mixing chamber having motor-driven stirring means and motor-driven means for removing measured portions of the powdered material from the mixing chamber and is particularly directed to the combination in which a single motor is connected to drive one of the stirring means and the metering means directly, and the other indirectly through the driven one.

Advantageously, said stirring means and said metering means are connected together by a power-transfer means adapted to maintain a predetermined rate of rotation of one of said means with respect to the other. Also, advantageously, the power means is adjustable so that the predetermined rate of rotation can be altered.

This may be effectively accomplished by means of a gear train having a changeable gear ratio. Advantageously, in this case, the stirring means and the metering means each comprises a vertically-disposed rotatable shaft having replaceable gears attached thereto, which replaceable gears mesh with gear means for transmitting rotary motion of one of the replaceable gears to the other, and which gear means is adapted to mesh with the replaceable gears even when one or both of said replaceable gears is replaced by a larger or smaller gear. Advantageously, the gear means comprises an idler gear adjustable to shift the idler gear into engagement with any gear that replaces a gear of different size.

In accordance with a preferred form of the invention, the mixing chamber comprises a vertically-disposed cylinder, and the stirring means a rotatable shaft axially-disposed in the cylinder and having radially-projecting arms extending from the shaft to a point adjacent the inner periphery of the cylinder, which arms project from the shaft at spaced intervals from adjacent the bottom of the cylinder to the top thereof. Each successive arm may be angularly displaced with respect to the arm above or below it, and the arms may be curved into but preferably away from the direction of rotation.

Advantageously, the metering means comprises a second rotatable shaft parallel to the first rotatable shaft and having a circular disc normal thereto adapted to rotate therewith on top of an annular plate concentric with the second shaft, which disc and annular plate project into the mixing chamber and are provided with a plurality of peripherally-disposed through holes in the disc, disposed so that at least one of them has its top exposed to the powdered material in the cylinder and its bottom closed by the annular plate which has a complementary through hole therein remote from the mixing chamber in a position adapted to register with the through holes in the disc in succession as the disc is rotated. Discharge means, advantageously, is provided at the point of registry of a through hole with the complementary through hole for discharging the contents of the through holes successively as they come into registry with the complementary through hole.

Advantageously, the disc has an annular shoulder adapted to fit into the center of the annular plate with the peripheral part of the disc overlying the plate, thereby forming a composite disc, which composite disc is, advantageously, replaceable with one having the same thickness but in which the annular plate and the overlying portion of the disc have different thicknesses than in the composite disc replaced, whereby the through holes in the disc will have greater or lesser volume than the through holes in the replaced disc.

BRIEF DESCRIPTION OF THE DRAWINGS

In the drawings:

FIG. 7 is a view like that of FIG. 6 of the modification shown in FIG. 8.
FIG. 8 is a view corresponding to FIG. 5 of a modified form of the invention.
FIG. 9 is a detail view of the gear train.

DETAILED DESCRIPTION OF THE INVENTION

Figure 3:
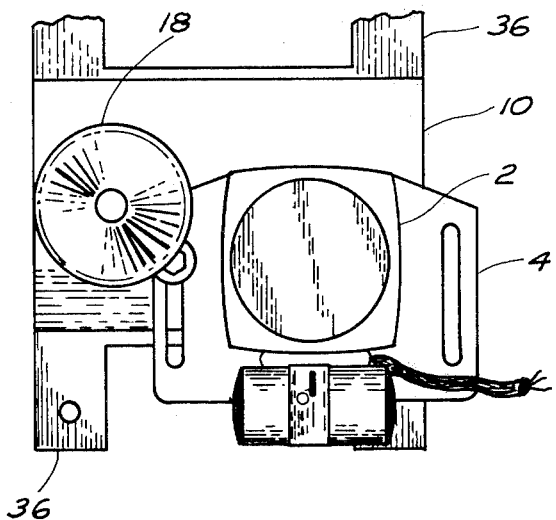
FIG. 3 is a plan view of FIG. 1.
Figure 1:
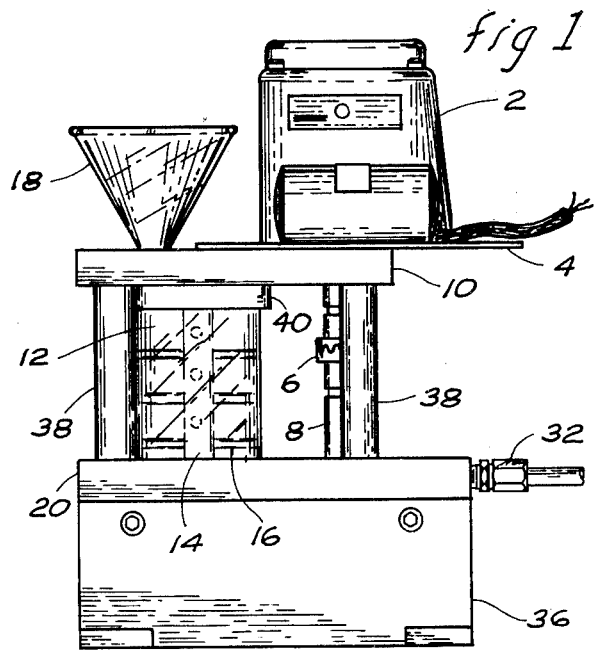
FIG. 1 is a side elevation of one form of the invention.
Figure 2:
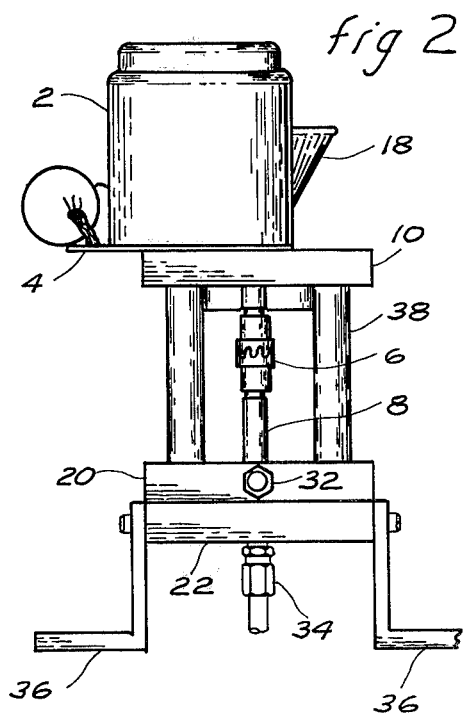
FIG. 2 is an end elevation of FIG. 1.
Figure 4:
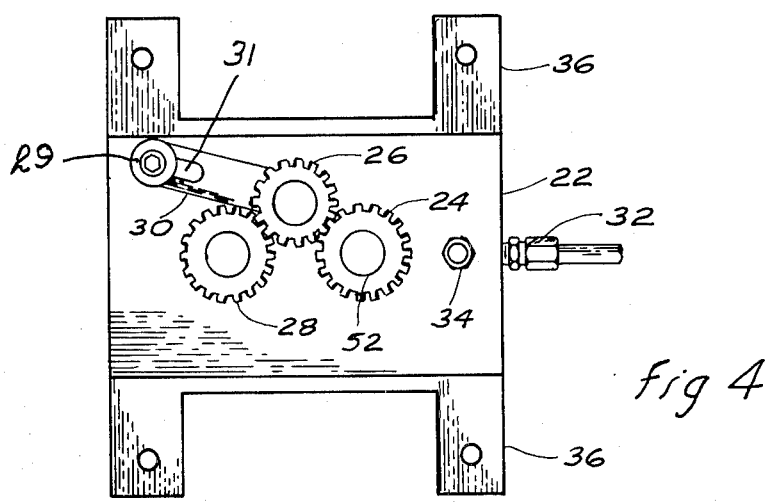
FIG. 4 is a bottom view of FIG. 1.
Figure 6:
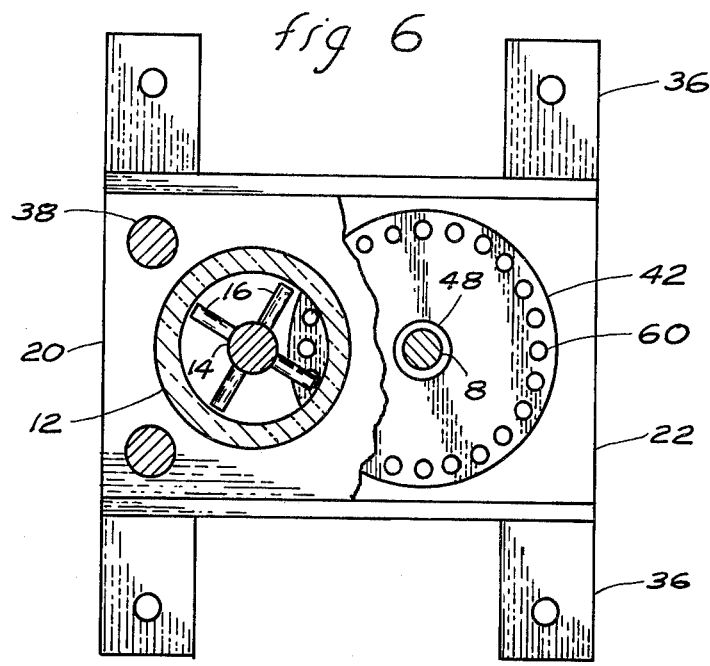
FIG. 6 is a view corresponding to FIG. 3 with parts broken away and parts in section.

Referring now particularly to FIGS. 1 through 6, there is disclosed a modification of the invention in which 2 is the motor; 4 is the motor mounting plate; 6 is a coupling, which couples the drive shaft of the motor to the rotatable shaft 8; 10 is an upper support plate; 12 is a mixing chamber or reservoir; 14 is a rotatable shaft in the mixing chamber 12 having radially-projecting arms 16 which project outwardly to near the inner periphery of the mixing chamber 12 and are spaced axially from near the bottom of the mixing chamber to the top thereof; 18 is a funnel or hopper for charging the mixing chamber 12 with powdered material; 20 is an intermediate support plate which rests on the lower support plate 22. Removably attached to the bottom end of shaft 8 is a gear 24 which meshes with idler gear 26, which in turn meshes with gear 28 which is removably attached to the bottom end of shaft 14. The idler gear 26 is mounted on arm 30 which can be locked in position by the bolt 29. The arm 30 has slot 31 therein so that the length from the idler gear 26 to the bolt 29 can be adjusted. An air inlet is shown at 32; a dust-suspension outlet at 34, for a purpose that will be described; a mounting base at 36; support columns at 38, for supporting the upper support plate 10 and for tying it and the plates 20 and 22 into a unitary structure.

The outer wall of the mixing chamber 12 is formed as a cylinder made of glass, plastic, or other suitable material, and is sealed in place by the gasket 40 which is placed under compression against the cylinder 12 when the plates 10 and 20 and 22 are tied together by the column 38. Attached to the shaft 8 is a metering disc 42 having a hub or shoulder 41 depending from the flat peripheral portion 43. The hub 41 is in a complementary well in the lower support plate 22 and the peripheral portion 43 rests on plate 22 in a depression complementary thereto, that is, a depression having a depth which is the width or thickness of the peripheral portion 43 and which has a circumference conforming to the circumference of the metering disc 42. An annular sealing gland 44 is provided to effect a seal between the plate 22 and the peripheral portion 43 of the metering disc 42. Shown at 46 are keys for keying the metering disc 42 and the gear 24 to shaft 8 and the gear 28 to shaft 14.

Figure 5:
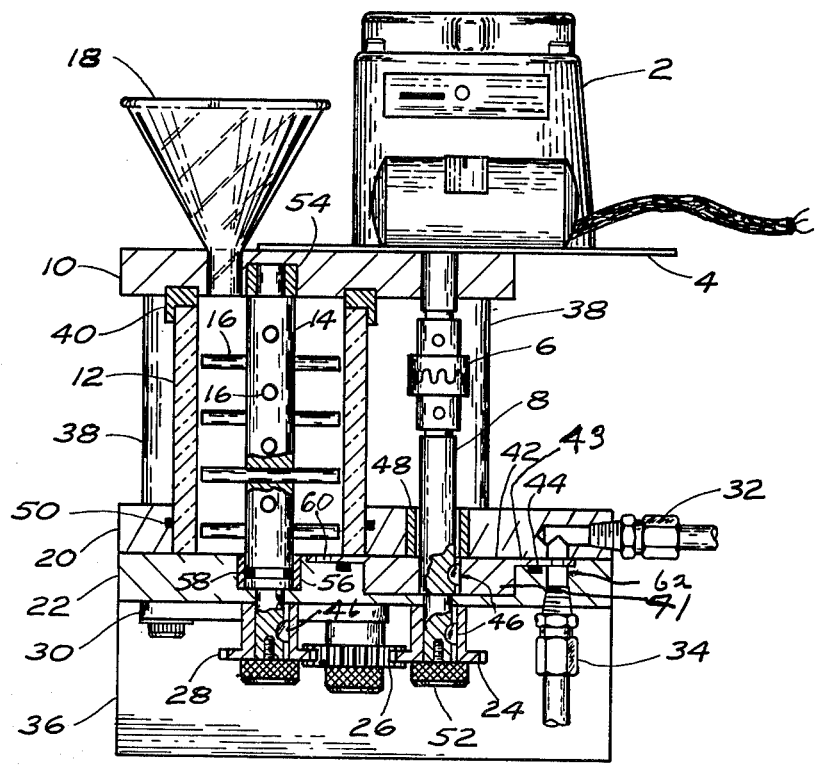
FIG. 5 is a sectional view of FIG. 1.

In FIG. 5, 48 is a bearing in plate 20 in which the shaft 8 is journaled; 50 is a packing gland for sealing the cylinder 12 in the plate 20; 52 are gear retainers which are knurled and threaded for easy removal; 56 is a bearing mounted in plate 22 in which shaft 14 is journaled and 58 is a packing gland therein; and 60 are through holes in the metering disc 42 which register with the mixing chamber 12 and with a complementary through hole 62 in the plate 22 which is located outside of the mixing chamber 12 in a remote position.

The operation of the device shown in FIGS. 1 through 6 is that the motor 2 drives a shaft 8 and causes the metering disc 42 and the stirring shaft 14 to rotate. The rotation of the stirring shaft 14 is effected indirectly through the gears 24, 26, and 28 and keeps the powdered material in the reservoir or mixing chamber 12 free-flowing so that it can fill the through holes 60. As the metering disc 42 is rotated, the through holes loaded with powdered material pass out under the bottom of the outer wall 12 of the mixing chamber where any surplus powder is scraped off and thence under the plate 20 over into registry with the complementary through hole 62, where a pressure of air from the air inlet 32 blows the powdered material out as an air suspension into the outlet 34 where it is delivered for such purposes as a metered amount of dust in air suspension may be required. If the indexing disc 42 is rotated continuously, an intermittent discharge of air suspension of the powdered material is effected through the outlet 34. By increasing the speed of the motor, the through put of powder will be increased proportionately.

In order to accommodate heavier or lighter material or material which is less free-flowing, it is sometimes desirable to increase the relative speed of the stirring shaft 14. This is effected by replacing gear 28 with a smaller gear and gear 24 with a larger gear. Whatever the replacement, the position of the idler gear 26 can be adjusted by unloosening bolt 29 and adjusting arm 30 so that the idler gear 26 again meshes with gear 24 and gear 28. If a lighter powder material is used which needs less agitation, the reverse is done. Thus, the apparatus according to FIGS. 1 through 6 provides a metering device for metering powdered material which is capable of handling both free-flowing powder and non-free-flowing powder and which can easily be adjusted according to the particular characteristic of the powder which it is desired to meter.

Now referring to FIGS. 7, 8, and 9, there is shown another modification of the invention in which the mixing chamber has a larger capacity and has an agitator of improved design for operating in a mixing chamber of larger diameter. The modification also has means whereby the metering disc can be replaced by one having larger or smaller capacity through holes. In FIGS. 7, 8, and 9, those parts which correspond to the parts of the other modification are designated by the same number plus 100. For example, the motor 2 of FIGS. 1 through 6 corresponds to the motor 102 of FIGS. 7, 8, and 9.

In this form of the invention, the cylindrical wall 112 is seated between the annular gaskets 113 which are compressed against the top and bottom of the cylinder 112 by the plates 110 and 120. The arms 116 which project radially from the shaft 114 are angularly displaced in a step-wise fashion from the bottom to the top, or vice versa, and are curved away from the direction of rotation. The angle of displacement is between about 20 and 25 degrees and the curvature of the arms has a radius between about one and two times the radius of the cylinder 112. Thus, when the shaft 114 is rotated in a clockwise direction, the arms are curved into the powder material and progressively disturb the powder from the bottom to the top in a step-wise fashion. At the same time, the powder is progressively pushed to the peripheral area to facilitate the filling of the holes of the metering disc with the powder.

The peripheral portion 143 and the shoulder or hub 141 of the metering disc 142 rests on and is complementary with the annular plate 164, and forms with the metering disc 142 a composite disc. The annular plate 164 is seated in a complementary well 166 where it fits into a key 167 so that it does not rotate when the metering disc 142 is rotated. Thus, as the metering disc 142 is rotated, the through holes 160 pick up powder material from the mixing chamber 112 and are carried around to the complementary through hole 162 where it is discharged as in the other modification.

The advantage of this construction is that the composite disc, comprising the metering disc 142 and the annular plate 164, can be replaced by one in which the relative thickness of the annular plate 164 and the overlying portion 143 is different so that the through holes 160 will have greater or lesser volume. In this way, the device can be adjusted according to the amount of dust that it is desired to have delivered with each pulse.

If desired, the motor 2 or 102 can be a Servo motor capable of instantaneous stopping and starting which can be programmed with an indexing circuit to bring one through hole 160 to the discharge position at a time or, in groups of two or more, as may be desired.

It is to be understood that the invention is not to be limited to the exact details of operation or structure shown and described, as obvious modifications and equivalents will be apparent to one skilled in the art.

I claim:

1. In a metering device for metering a powdered material which is capable of handling both free-flowing powders and non free-flowing powders, which device comprises a mixing chamber having a rotary-driven stirring means therein, and rotary-driven metering means for removing measured portions of powdered material from said mixing chamber, the combination therewith of a motor which is connected to drive one of said stirring means and said metering means directly, and the other indirectly, in which said stirring means and said metering means are connected together by a power-transfer means adapted to maintain a predetermined rate of rotation of one of said means with respect to the other, said power-transfer means being adjustable so that the said predetermined rate of rotation can be altered, and in which said power-transfer means comprises a gear train having a changeable gear ratio.

2. The metering device of claim 1, in which said stirring means and said metering means each comprises a vertically-disposed rotatable shaft having replaceable gears attached thereto, said replaceable gears meshing with a gear means for transmitting rotary motion of one of said replaceable gears to the other, and said gear means being adapted to mesh with said replaceable gears even when one or both of said replaceable gears is replaced by a larger or smaller gear.

3. The metering device of claim 2, in which said gear means comprises an idler gear adjustable to shift said idler gear into engagement with the replaced gears.

4. The metering device of claim 3, in which said mixing chamber comprises a vertically-disposed cylinder and said stirring means comprises a rotatable shaft axially disposed in said cylinder and having radially-projecting arms extending from said shaft to a point adjacent the inner periphery thereof, said arms projecting from said shaft at spaced intervals from adjacent the bottom of said cylinder to the top thereof.

5. The metering device of claim 4, in which each successive arm is angularly displaced with respect to the arm above or below it.

6. The metering device of claim 5, in which said arms are curved away from the direction of rotation.

7. The metering device of claim 2, in which said metering means comprises a rotatable shaft parallel to said first rotatable shaft and having a circular disc normal thereto and adapted to rotate therewith, an annular plate concentric with said second shaft and underlying said disc in contact therewith, said disc and said annular plate projecting into said cylinder; in which said disc has a plurality of peripherally-disposed through holes therein, disposed so that at least one of them has its open top exposed to the powdered material in said cylinder and its bottom closed by said annular plate; in which said annular plate has a complementary through hole therein remote from said cylinder in a position adapted to register with the through holes in said disc in succession as said disc is rotated; and which further comprises means positioned at the point of registry of a through hole with said complementary through hole for discharging the contents of the through holes successively as they come into registry with said complementary through hole.

8. The metering device of claim 7, in which said disc has a circular shoulder adapted to fit into the center of said annular plate with the peripheral part of said disc overlying said annular plate, thereby forming a composite disc.

9. The metering device of claim 8, in which said composite disc is replaceable with one having the same thickness but in which the annular plate and the overlying portion of said disc has a different thickness than in the composite disc replaced, whereby the through holes in said disc will have greater or lesser volume than the through holes in the replaced disc.

10. The metering device of claim 9, in which said stirring means and said metering means are connected together by a power-transfer means adapted to maintain a predetermined rate of rotation of one of said means with respect to the other, in which said power-transfer means is adjustable so that the said predetermined rate of rotation can be altered, and in which said power-transfer means comprises a gear train having a changeable gear ratio.

11. In a metering device for metering a powdered material which is capable of handling both free-flowing powders and non free-flowing powders, which device comprises a mixing chamber having a rotary-driven stirring means therein, and rotary-driven metering means for removing measured portions of powdered material from said mixing chamber, the combination therewith of a motor which is connected to drive one of said stirring means and said metering means directly, and the other indirectly, in which said mixing chamber comprises a vertically-disposed cylinder and said stirring means comprises a rotatable shaft axially disposed in said cylinder and having radially-projecting arms extending from said shaft to a point adjacent the inner periphery thereof, said arms projecting from said shaft at spaced intervals from adjacent the bottom of said cylinder to the top thereof, and in which said metering means comprises a rotatable shaft parallel to said first rotatable shaft and having a circular disc normal thereto and adapted to rotate therewith, an annular plate concentric with said second shaft and underlying said disc in contact therewith, said disc and said annular plate projecting into said cylinder; in which said disc has a plurality of peripherally-disposed through holes therein, disposed so that at least one of them has its open top exposed to the powdered material in said cylinder and its bottom closed by said annular plate; in which said annular plate has a complementary through hole therein remote from said cylinder in a position adapted to register with the through holes in said disc in succession as said disc is rotated; and which further comprises means positioned at the point of registry of a through hole with said complementary through hole for discharging the contents of the through holes successively as they come into registry with said complementary through hole.

12. The metering device of claim 11, in which each successive arm is angularly displaced with respect to the arm above or below it.

13. The metering device of claim 11, in which said arms are curved away from the direction of rotation.

14. The metering device of claim 11, in which said disc has a circular shoulder adapted to fit into the center of said annular plate with the peripheral part of said disc overlying said annular plate, thereby forming a composite disc.

15. The metering device of claim 14, in which said composite disc is replaceable with one having the same thickness but in which the annular plate and the overlying portion of said disc has a different thickness than in the composite disc replaced, whereby the through holes in said disc will have greater or lesser volume than the through holes in the replaced disc.

16. The metering device of claim 11, in which said stirring means and said metering means are connected together by a power-transfer means adapted to maintain a predetermined rate of rotation of one of said means with respect to the other, and in which said power-transfer means is adjustable so that the said predetermined rate of rotation can be altered.

* * * * *